(12) United States Patent
Kim (10) Patent No.: US 8,771,851 B2
(45) Date of Patent: Jul. 8, 2014

(54) BATTERY PACK (75) Inventor: Bongyoung Kim, Gyeonggi-do (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 169 days.

(21) Appl. No.: 13/340,794

(22) Filed: Dec. 30, 2011

(65) Prior Publication Data

US 2012/0315507 A1 Dec. 13, 2012

(30) Foreign Application Priority Data

Jun. 7, 2011 (KR) ........................ 10-2011-0054530

(51) Int. Cl.
*H01M 2/00* (2006.01)
*H01M 2/10* (2006.01)

(52) U.S. Cl.
USPC ................................. 429/7; 29/756; 337/158

(58) Field of Classification Search
None
See application file for complete search history.

(56) References Cited

U.S. PATENT DOCUMENTS

| | | | |
|---|---|---|---|
| 4,188,460 A | 2/1980 | Kang et al. | |
| 5,401,595 A | 3/1995 | Kagawa et al. | |
| 6,146,788 A * | 11/2000 | Ikeda et al. | 429/160 |
| 6,556,122 B2 * | 4/2003 | Izaki et al. | 337/405 |
| 2009/0092897 A1 | 4/2009 | Lee | |
| 2010/0124834 A1 * | 5/2010 | De Chazal et al. | 439/271 |
| 2011/0183165 A1 | 7/2011 | Byun et al. | |
| 2011/0195282 A1 | 8/2011 | Lee | |

FOREIGN PATENT DOCUMENTS

| | | |
|---|---|---|
| EP | 0570590 A1 | 12/1992 |
| JP | 08-185850 A | 7/1996 |
| JP | 10-214614 A | 8/1998 |
| JP | 2002-170537 | 6/2002 |
| JP | 2008-288077 | 11/2008 |
| JP | 2009-158219 | 7/2009 |
| JP | 2010-251127 | 4/2010 |
| KR | 10-2006-0019773 A | 3/2006 |
| KR | 10-2007-0101568 A | 10/2007 |
| KR | 10-2009-0035226 A | 4/2009 |
| KR | 10-1036070 | 5/2011 |

OTHER PUBLICATIONS

European Search Report in EP 12156384.5-1227, dated Oct. 11, 2012 Kim.
Korean Office Action in KR 10-2011-0054530 dated Sep. 21, 2012 Kim.

* cited by examiner

*Primary Examiner* — Patrick Ryan
*Assistant Examiner* — Christopher Domone
(74) *Attorney, Agent, or Firm* — Lee & Morse, P.C.

(57) ABSTRACT

A battery pack includes a plurality of batteries, a circuit board electrically connected to the batteries, a housing having a battery receiving unit to receive the plurality of batteries, the circuit board being at an end of the housing, and a fuse unit electrically connected between the batteries and the circuit board. The fuse unit is coupled to a fuse fixing unit at a side surface of the housing.

18 Claims, 10 Drawing Sheets

BATTERY PACK

BACKGROUND

1. Field

Embodiments relate to a battery pack.

2. Description of the Related Art

A battery can be used as a power storage device that includes a plurality of battery cells electrically connected to each other and stores power in the respective battery cells to then be used if necessary.

In order to monitor temperature information of a battery and to detect a state of emergency, such as overheating, to prevent an accident such as fire or explosion, the battery pack may include a temperature sensor and a circuit for processing output signals of the temperature sensor.

SUMMARY

According to an embodiment, there is provided a battery pack including a plurality of batteries, a housing having a battery receiving unit to receive the plurality of batteries, a circuit board electrically connected to the batteries, the circuit board being at an end of the housing, and a fuse unit electrically connected between the batteries and the circuit board, wherein the fuse unit is coupled to a fuse fixing unit at a side surface of the housing.

The circuit board may include a fuse connection unit to which one portion of the fuse unit is coupled. The fuse connection unit may include a perforation hole through which the one portion of the fuse unit passes and an opening that connects a portion of the inner surface of the perforation hole to an edge of the circuit board. A first soldering pad at least partially surrounds the perforation hole at an exterior-facing surface of the circuit board.

The circuit board may further include a second soldering pad, the second soldering pad being spaced apart from and at least partially surrounding the first soldering pad at the exterior-facing surface of the circuit board.

The second soldering pad may have an arc shape.

The second soldering pad may be divided into at least two arc-shaped segments.

The fuse connection unit may be soldered to couple the first soldering pad and the one side of the fuse unit.

The fuse connection unit may be soldered to receive the second soldering pad and the one portion of the fuse unit.

The fuse unit may include a fuse body including a fuse element and a sheath member surrounding the exterior of the fuse element, a first lead connected to one side of the fuse element and protruding to the outside of the fuse body, and a second lead connected to another side of the fuse element and protruding to the outside of the fuse body.

The fuse body may be coupled to the fuse fixing unit by an interference fit.

The fuse fixing unit may have an inner surface corresponding in shape to the fuse body, the inner surface extending from the side surface of the housing in an arc shape. The fuse body may engage the fuse fixing unit such that the fuse body contacts a side surface of the housing.

The first lead may be electrically connected to one battery of the plurality of batteries. The second lead may be electrically connected to the circuit board.

The fuse unit may be connected to a lead member that is connected to one battery of the plurality of batteries.

The lead member may include a battery connection unit connected to the one battery of the plurality of batteries and a lead connection unit connected to a lead of the fuse unit. An insulation unit may be formed between the lead connection unit and an end portion of the lead member.

The insulation unit may be formed at an end portion of the lead member on which the lead of the fuse unit is placed.

The insulation unit may have an insulation tape adhered thereon.

The batteries may be connected to sub lead members in series or in parallel.

The sub lead members may have extensions that pass through respective lead holes formed in the circuit board. The extensions of the sub lead members having passed through the lead holes may be coupled to the circuit board by soldering.

According to an embodiment, there is provided a battery pack including a plurality of batteries, a housing having a battery receiving unit to receive the plurality of batteries, a circuit board electrically connected to the batteries, the circuit board being at one end of the housing, and a fuse unit electrically connected between the batteries and the circuit board, wherein the fuse unit is coupled to a fuse fixing unit at a side surface of the housing, the circuit board includes a fuse connection unit including a perforation hole through which one portion of the fuse unit passes and an opening that connects a portion of the inner surface of the perforation hole to an edge of the circuit board, and the batteries and the fuse unit are connected to a lead member, the lead member including a lead connection unit connected to the fuse unit and an insulation unit formed between the lead connection unit and an end portion of the lead member.

The insulation unit may have an insulation tape adhered thereon.

An exterior surface of the circuit board may include a first soldering pad that at least partially surrounds the perforation hole.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Korean Patent Application No. 10-2011-0054530, filed on Jun. 7, 2011, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art.

In the drawing figures, the dimensions of layers and regions may be exaggerated for clarity of illustration. Like reference numerals refer to like elements throughout.

A battery pack 100 will now be described in more detail with reference to example embodiments and the accompanying drawings.

First, the battery pack 100 according to one embodiment will be described.

Figure 1:
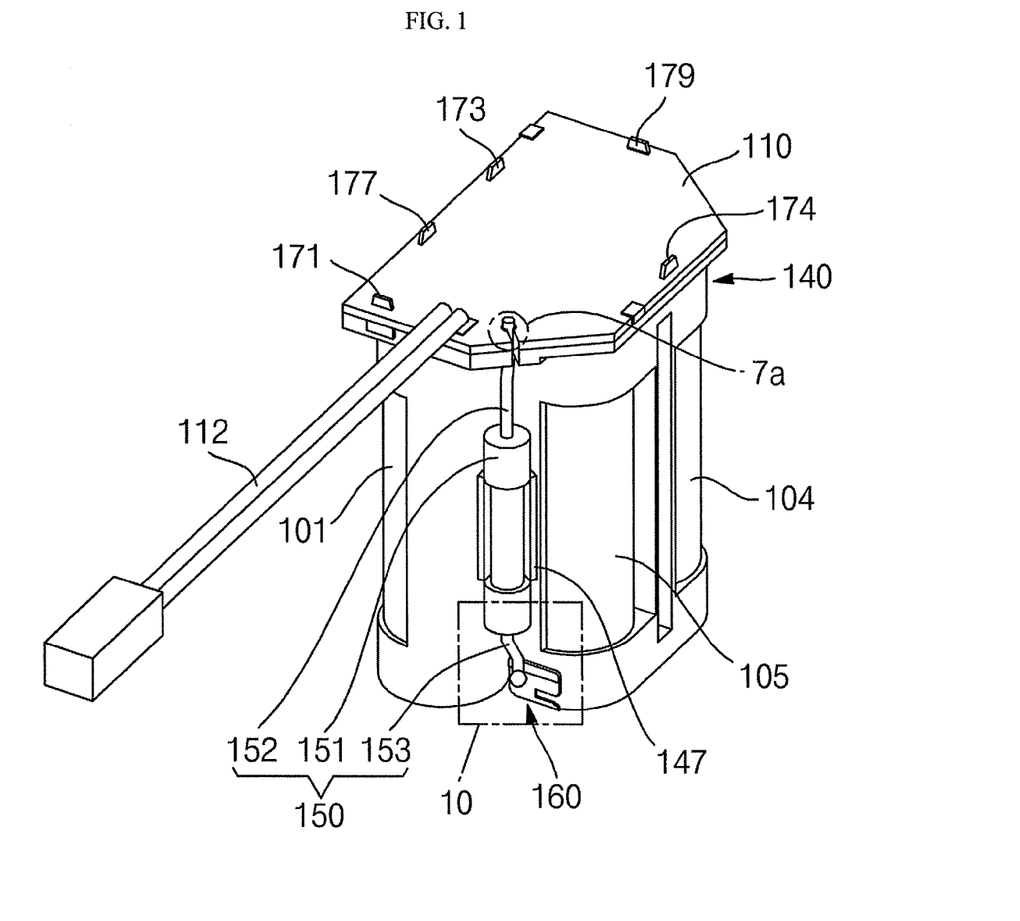
FIG. 1 illustrates a perspective view of a battery pack according to an embodiment.
Figure 2:
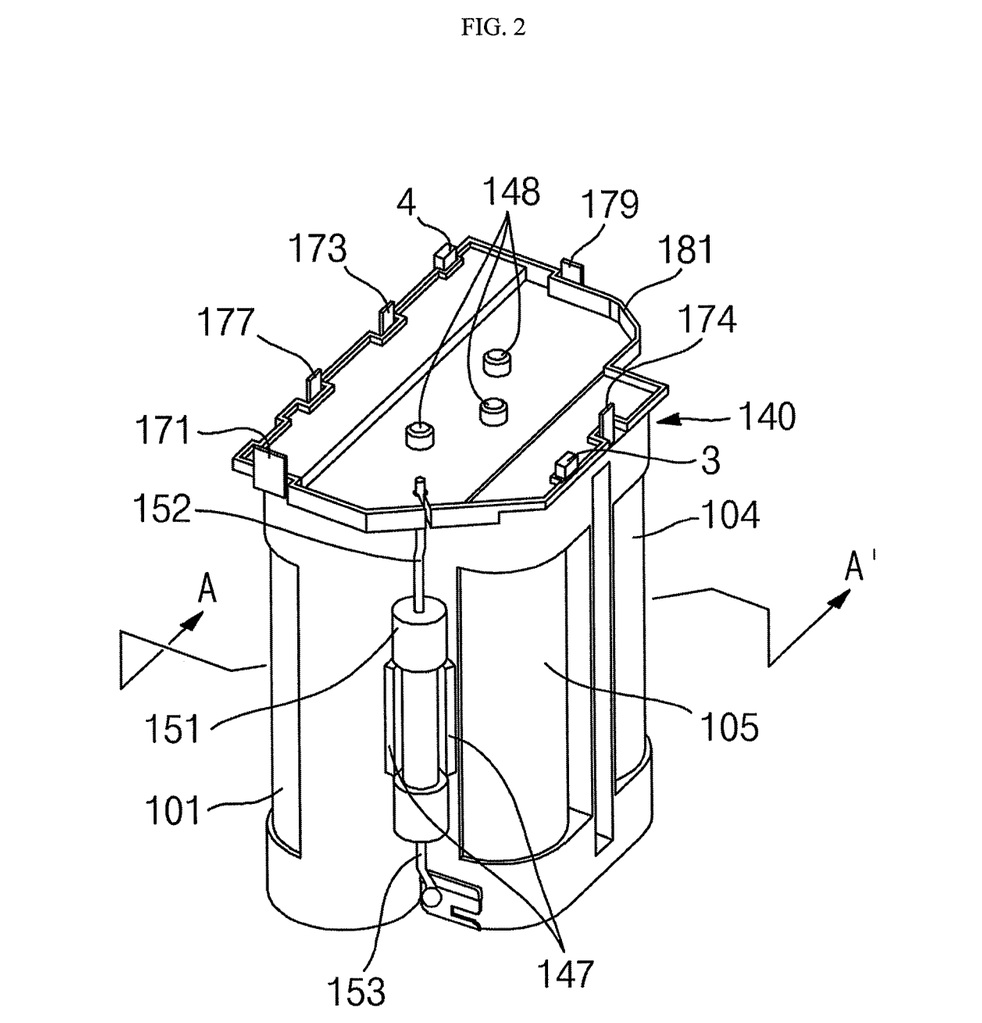
FIG. 2 illustrates a perspective view of the battery pack shown in FIG. 1, from which a circuit board is removed.
Figure 3A:
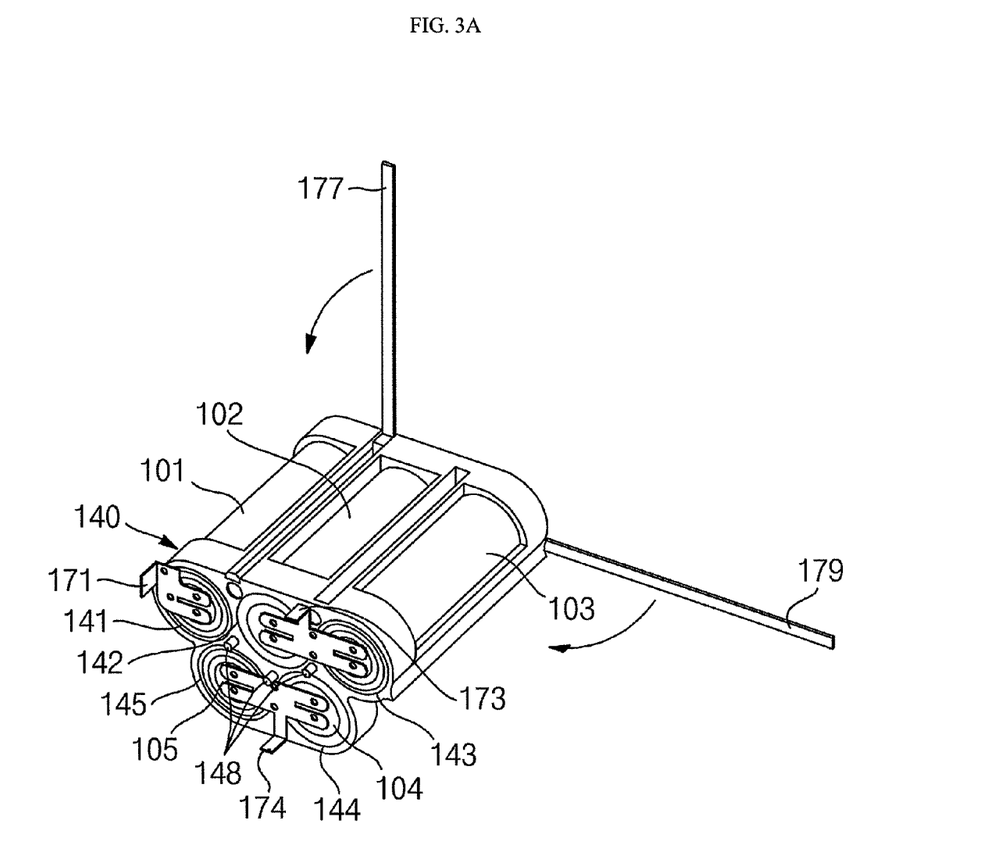
FIG. 3A illustrates a perspective view depicting a connection relationship between a top portion of a battery and sub lead members to correspond to FIG. 1.
Figure 3B:
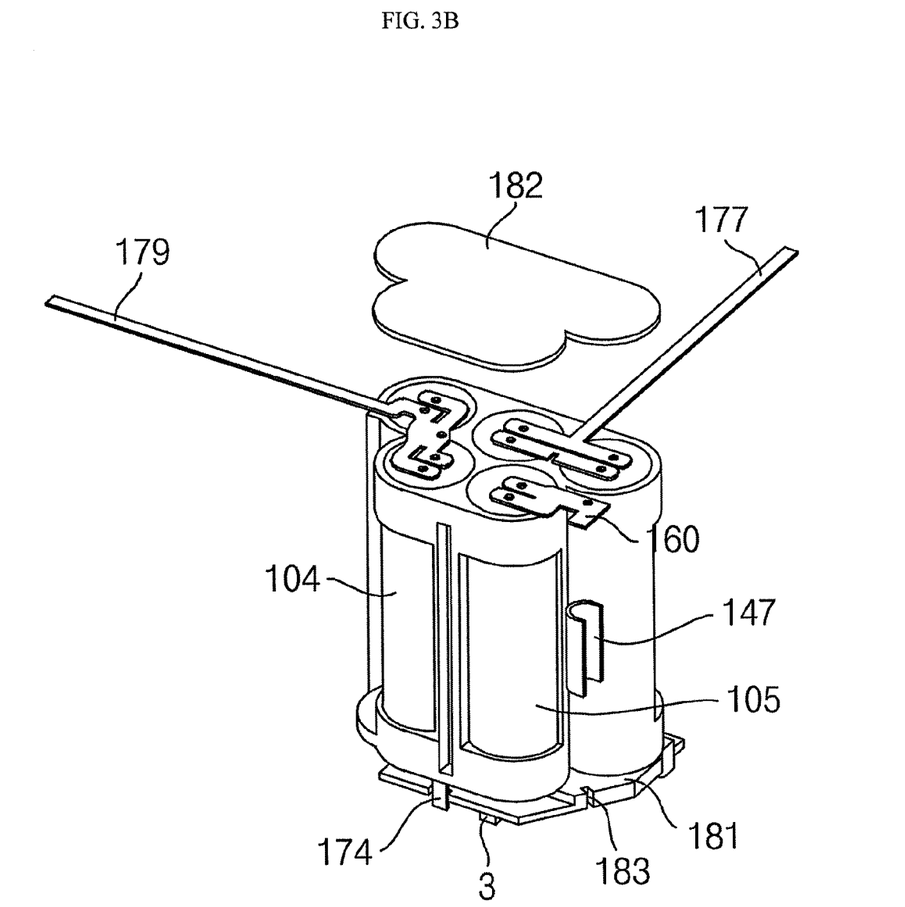
FIG. 3B illustrates a perspective view depicting a connection relationship between a bottom portion of a battery and sub lead members.
Figure 4:
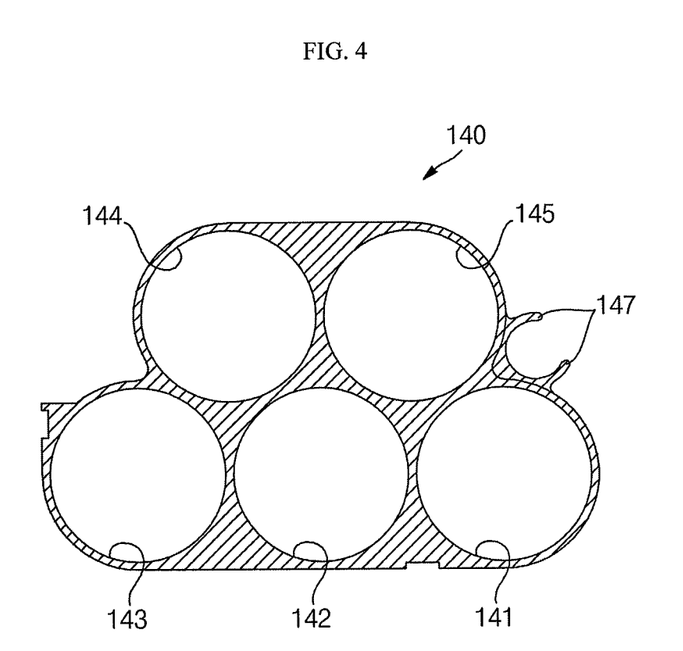
FIG. 4 illustrates a vertical cross-sectional view depicting only a housing, taken along the line A-A' of FIG. 2.
Figure 5:
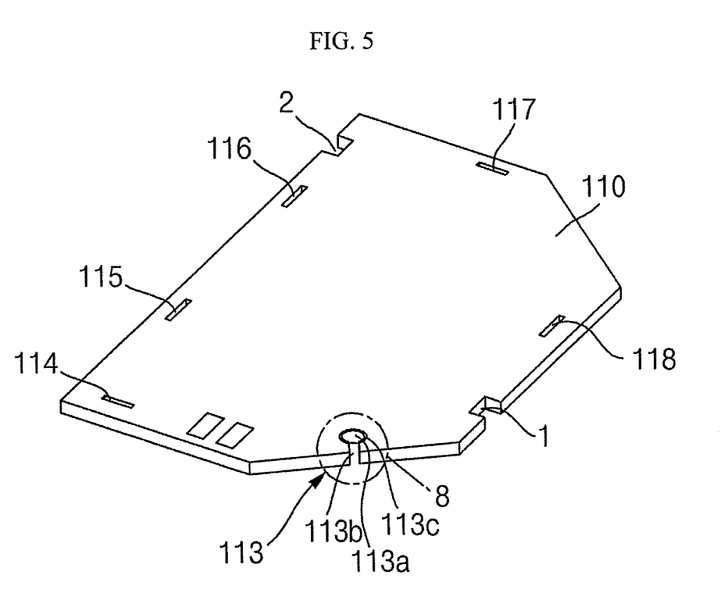
FIG. 5 illustrates a perspective view of the circuit board shown in FIG. 1.
Figure 6:
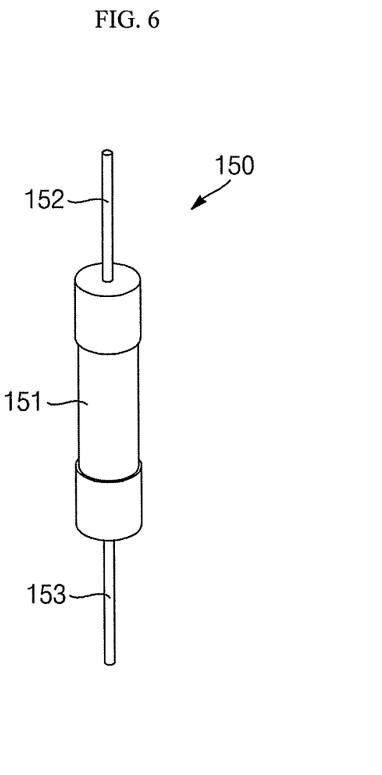
FIG. 6 illustrates a perspective view of the fuse unit shown in FIG. 1.
Figure 7A:
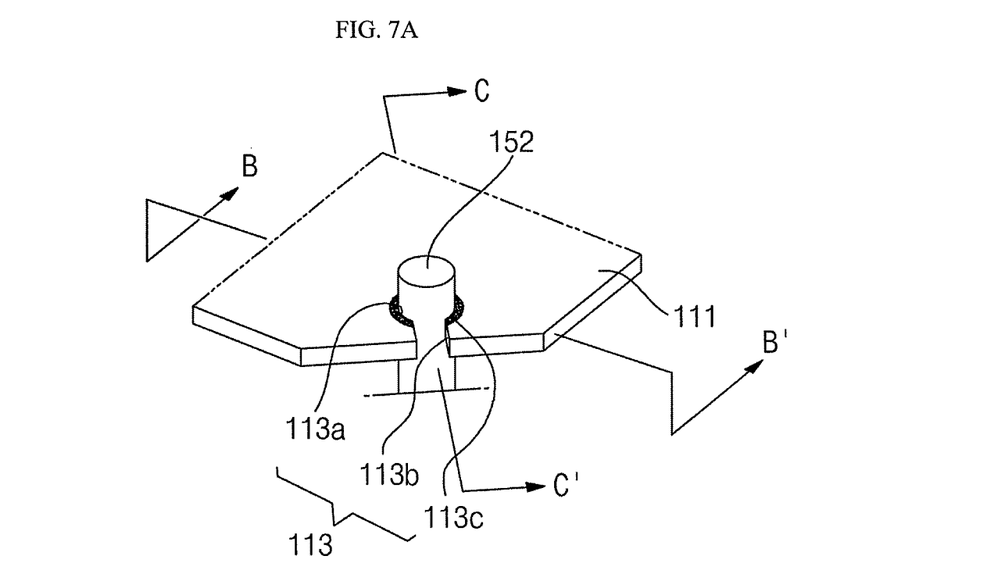
FIG. 7A illustrates an enlarged perspective view of a portion 7a shown in FIG. 1.
Figure 7B:
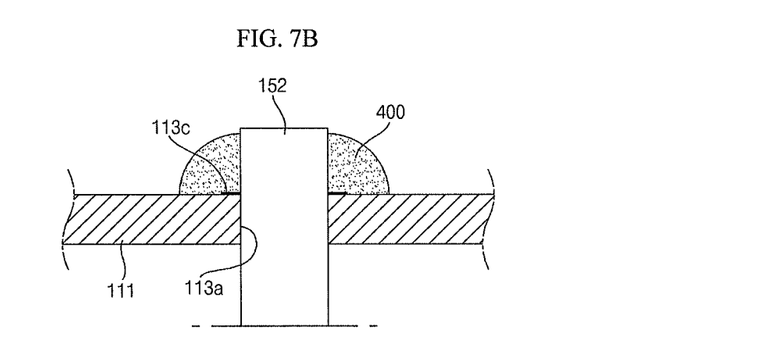
FIG. 7B illustrates a cross-sectional view depicting a soldering connection between a circuit board and a fuse unit, taken along the line B-B' of FIG. 7.
Figure 7C:
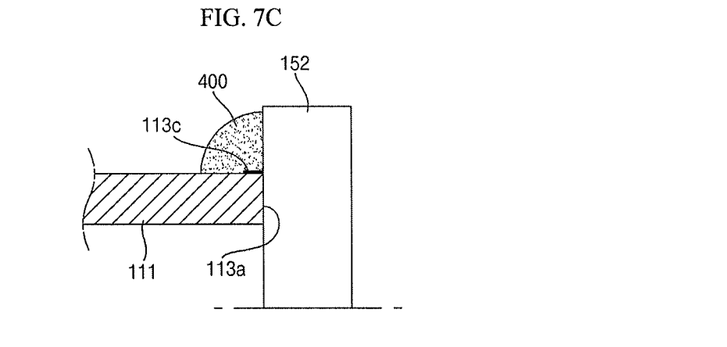
FIG. 7C illustrates a cross-sectional view depicting a soldering connection between a circuit board and a fuse unit, taken along the line C-C' of FIG. 7.
Figure 10:
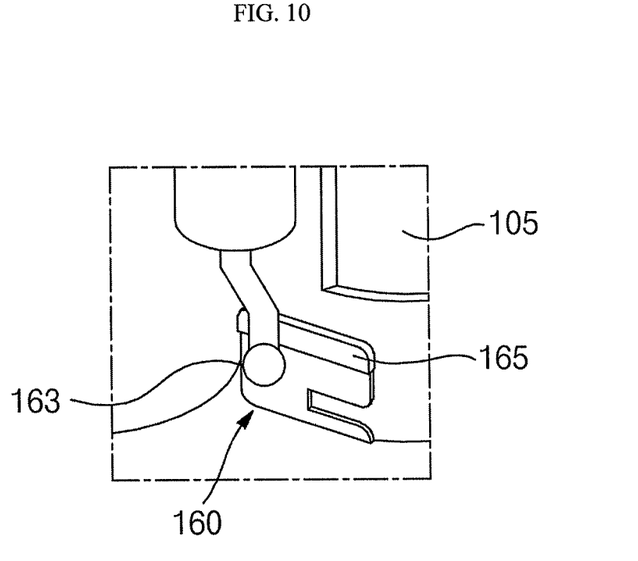
FIG. 10 illustrates an enlarged perspective view depicting a portion denoted by reference numeral '10' in FIG. 1.
Figure 11:
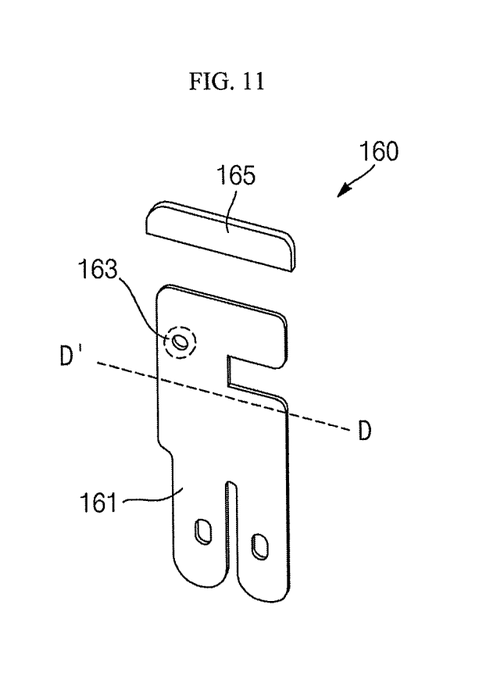
FIG. 11 illustrates an exploded perspective view of a lead member shown in FIG. 10.

FIG. 1 illustrates a perspective view of a battery pack according to an embodiment. FIG. 2 illustrates a perspective view of the battery pack shown in FIG. 1, from which a circuit board is removed. FIG. 3A illustrates a perspective view depicting a connection relationship between a top portion of a battery and sub lead members to correspond to FIG. 1. FIG. 3B illustrates a perspective view depicting a connection relationship between a bottom portion of a battery and sub lead members. FIG. 4 illustrates a vertical cross-sectional view depicting only a housing, taken along the line A-A' of FIG. 1. FIG. 5 illustrates a perspective view of a circuit board shown in FIG. 1. FIG. 6 illustrates a perspective view of a fuse unit shown in FIG. 1. FIG. 7A illustrates an enlarged perspective view of a portion 7a shown in FIG. 1. FIG. 7B illustrates a cross-sectional view depicting a soldering connection between a circuit board and a fuse unit, taken along the line B-B' of FIG. 7. FIG. 7C illustrates a cross-sectional view depicting a soldering connection between a circuit board and a fuse unit, taken along the line C-C' of FIG. 7. FIG. 10 illustrates an enlarged perspective view depicting a portion denoted by reference numeral '10' in FIG. 1. FIG. 11 illustrates an exploded perspective view of a lead member shown in FIG. 10.

The battery pack 100 according to the embodiment includes a plurality of batteries 101, 102, 103, 104 and 105, a circuit board 110, a housing 140 and a fuse unit 150.

In the battery pack 100, the plurality of batteries 101, 102, 103, 104 and 105 may be received in the housing 140 and may be formed into a module. The plurality of batteries 101, 102, 103, 104 and 105 may be electrically connected using sub lead members 171, 173, 174, 177 and 179. The sub lead members 171, 173, 174, 177 and 179 may be electrically connected to the circuit board 110. At least one of the plurality of batteries 101, 102, 103, 104 and 105 may be electrically connected to the circuit board 110 through the fuse unit 150.

The fuse unit 150 may be coupled to a fuse fixing unit 147 formed at one side of the housing 140.

The plurality of batteries 101, 102, 103, 104 and 105 may be connected to each other in series and/or in parallel. A combination of serial connection and parallel connection may be used, such that some of the plurality of batteries 101, 102, 103, 104 and 105 are connected to each other in parallel and the remaining batteries ones are connected to each other in series. While five (5) batteries 101, 102, 103, 104 and 105 are illustrated in the embodiment, the battery pack 100 may include a predetermined number of batteries arranged in a horizontal or vertical direction. The number and arrangement of batteries connected to each other may be changed in various manners.

In the following description, the present embodiment will be described with regard to one battery 101 among the plurality of batteries 101, 102, 103, 104 and 105 by way of example. The battery 101 may be one of various types, such as, for example, a rechargeable cylindrical battery. As an example, one side of the battery 101 may be shaped as a convex terminal and may be a positive electrode. Another side of the battery 101 may have a flat bottom surface and may be a negative electrode. The convex terminal may be electrically connected to a positive electrode of an electrode assembly formed within the battery 101 and the flat bottom surface terminal may be electrically connected to a negative electrode of the electrode assembly. The side surface of the battery 101 may be wrapped by a label made of an insulating material.

As a further example, the battery 101 may be a lithium-ion battery. As further examples, the battery 101 may be a nickel-cadmium battery, a nickel metal hydride (NiMH) battery, or the like.

The circuit board 110 may include a wire 112, a fuse connection unit 113 and a plurality of lead holes 114, 115, 116, 117 and 118.

The circuit board 110 may include electric elements (not shown) and a circuit pattern layer (not shown). The electric elements may be formed to collect battery state information, such as a state of charge (SOC) or temperatures of the batteries 101, 102, 103, 104 and 105, and to control charge/discharge operations of the batteries 101, 102, 103, 104 and 105. In addition, the circuit pattern layer may be formed to connect the wire 112 to various components such as electric elements, the lead member, or the sub lead members. The wire 112 may be provided for data communication with an external circuit (not shown) or for power supply to an external power supply device (not shown) or an external load (not shown). In addition, the circuit board 110 may have a pair of fixing grooves 1 and 2 facing each other to fix the circuit board 110 to one end of the housing 140, as will be described below. The fixing grooves 1 and 2 may be engaged and fixed with protrusions 3 and 4 of an end plate, which will be described below.

The fuse connection unit 113 may include a perforation hole 113a through which a first lead 152 of the fuse unit 150 passes, as will be described below, and an opening 113b that connects a portion of the inner surface of the perforation hole 113a to an edge of the circuit board 110. The first lead 152 of the fuse unit 150 may pass through the fuse connection unit 113 and be soldered so to be fixed to the circuit board 110. The first lead 152 of the fuse unit 150 may be inserted into or removed from the opening 113b of the fuse connection unit 113. Accordingly, the fuse unit 150 may be easily replaced.

The fuse connection unit 113 may have a first soldering pad 113c formed at the outer circumference of the perforation hole 113a, excluding the opening 113b. The first soldering pad 113c may be formed on a top surface of the circuit board 110. The first soldering pad 113c may allow the fuse unit 150 and the wire 112 formed in the circuit board 110 to be electrically connected to each other by soldering. Referring to FIGS. 7B and 7C, the first soldering pad 113c may be fixed to the circuit board 110 by coupling the fuse connection unit 113, excluding the opening 113b, to the first lead 152 using a solder 400.

The sub lead members 171, 173, 177, and 179, which will be described below, may pass through the plurality of lead holes 114, 115, 116, 117 and 118 in the circuit board 110 to then be soldered. As shown in FIG. 5, the plurality of lead holes 114, 115, 116, 117 and 118 may include a predetermined number of perforation holes formed in the circuit board 110. The number and locations of the lead holes may vary according to the number and locations of sub lead members.

The sub lead members 177 and 179 may be disposed at an opposite end of the plurality of batteries 101, 102, 103, 104 and 105 from the sub lead members 171, 173 and 174. The sub lead members 171, 173, 174, 177 and 179 may connect the respective electrodes of ends of the batteries 101, 102, 103, 104 and 105 to each other in series/parallel. The series/parallel connection structure of the plurality of batteries 101, 102, 103, 104 and 105 may vary in various manners. The sub lead members 177 and 179 may each include a portion that extends from the respective electrodes at the ends of the batteries 101, 102, 103, 104 and 105. Although these portions of sub lead members 117 and 179 are depicted in FIGS. 3A and 3B as extending outwardly from the battery pack, it is to be understood that, when assembled, these portions may be bent in the directions shown in the arrows in FIG. 3A to connect with the respective lead holes 115 and 117 of the circuit board 110.

The housing 140 may include battery receiving units 141, 142, 143, 144 and 145, spacers (not shown) and a fuse fixing unit 147. The housing 140 may define a location at which the plurality of batteries 101, 102, 103, 104 and 105 are assembled. For example, the housing 140 may include spacers interposed between each of the batteries 101, 102, 103, 104 and 105 to maintain gaps between each of the batteries 101, 102, 103, 104 and 105. The housing 140 may be made from an insulating material. The housing 140 may be formed in various shapes according to the shapes of the plurality of batteries received therein. The housing 140 may include a plurality of protrusions 148 to allow an end plate 181 to be placed and fixed, as will be described below.

The fuse fixing unit 147 may be positioned at a region on an outside of the housing 140 and fixes the fuse unit 150, as will be described below. The fuse fixing unit 147 may protrude at the outside of the housing 140 so as to surround a fuse body 151, as will be described below. For example, the fuse fixing unit 147 may have protrusions symmetrically formed thereat, as shown in FIG. 4, and the fuse body 151 may be fixed between the protrusions by an interference fit method. In addition, the fuse fixing unit 147 may be formed at a region on an outside of the housing 140 to be shaped to correspond to the shape of the fuse body 151. While the illustrated fuse body 151 has an outer circumference having a circular section, the shape of the fuse body 151 may vary.

The fuse unit 150 may include the fuse body 151, a first lead 152 and a second lead 153. The fuse unit 150 may be positioned at the exterior side of the housing 140. In addition, the fuse unit 150 may be electrically connected between the batteries and the circuit board 110. When temperatures of the plurality of batteries 101, 102, 103, 104 and 105 rise or an over-current flows through the plurality of batteries 101, 102, 103, 104 and 105, the fuse unit 150 may interrupt the flow of current between the batteries and the circuit board 110.

The fuse body 151 may include a sensor unit (not shown) that senses the flow of current and a sheath member surrounding the exterior of the sensor unit. The sensor unit may be formed as a fuse sensor that may be used for a general fuse element. The sensor unit may have electric conductivity and may include a wire (not shown) made of a material that is melted at a predetermined temperature or higher and an insulating resin surrounding the wire. The wire may be made of a metal such as an alloy of lead (Pb) and tin (Sn).

The first lead 152 may be made of a conductive metal in a shape of a wire or a plate. The first lead 152 may have one side passing through the fuse connection unit 113 of the circuit board 110 and may be electrically connected to the fuse connection unit 113 by soldering.

The second lead 153 may also be made of a conductive metal in a shape of a wire or a plate. One side of the second lead 153 may be electrically connected to a lead member 160 connected to a battery to then be soldered.

The lead member 160 may include a battery connection unit 161 and a lead connection unit 163.

Referring to FIGS. 10 and 11, the lead member 160 may electrically connect one battery, such as battery 105, for example, of the plurality of batteries 101, 102, 103, 104, and 105, and the second lead 153. The lead member 160 may be formed from a plate-shaped metal member. In addition, the lead member 160 may be bent about an imaginary line D-D' so that it may have an L-shaped form. In addition, the lead member 160 may be fixed to the battery 105 and the second lead 153 by soldering or resistance welding. The lead member 160 may have perforation holes formed at its fixing locations.

The battery connection unit 161 may be electrically connected to a terminal of the battery. Referring to FIG. 11, the lead connection unit 163 may be bent about the imaginary line D-D' and may be fixed to the second lead 153 from the outside of the housing 140 by soldering or resistance welding.

The second lead 153 of the fuse 150 may be made of a metal. Thus, in the event that the second lead 153 is not fixed to the lead connection unit 163, the second lead 153 may be electrically connected to the lead member 160 even by a contact with a portion of the lead member 160, so that a soldering failure may not be detected.

To reduce the likelihood of such an occurrence, the lead member 160 may include an insulation unit 165. The insulation unit 165 prevents the second lead 153 from being electrically connected to the lead member 160, except at the location of the lead connection unit 163. The insulation unit 165 may be formed such that the whole or part thereof extends from the lead connection unit 163 to an end of the lead member 160. The insulation unit 165 may have an insulation tape adhered thereto. The insulation unit 165 may be formed by coating an insulating material on the whole or part of the lead member ranging from the lead connection unit 163 to the end of the lead member 160. The second lead 153 may include an electrically insulated region, except for where the lead connection unit 163 is fixed by soldering. Therefore, a soldering failure in a state in which the second lead 153 is in contact with the lead connection unit 163 may be detected.

The sub lead members 171, 173, 174, 177 and 179 may connect the plurality of batteries 101, 102, 103, 104 and 105 to each other in series or in parallel. Each of the sub lead members 171, 173, 174, 177 and 179 may be formed in a plate shape or in a bent form. The sub lead members 171, 173, 174, 177 and 179 may be used in electrically connecting the plurality of batteries 101, 102, 103, 104 and 105 to the circuit board 110. The sub lead members 171, 173, 174, 177 and 179 may be implemented in various shapes.

End plates 181 and 182 may be disposed at exterior sides of the sub lead members 171, 173, 174, 177 and 179. For example, the end plates 181 and 182 may be first and second end plates 181 and 182 disposed at opposite sides of the plurality of batteries 101, 102, 103, 104 and 105, respectively. The first and second end plates 181 and 182 may be formed as insulation members to insulate the lead members 171, 173, 174, 177 and 179 from external surroundings. The first end plate 181 may have protrusions 3 and 4 to be coupled to the circuit board 110. In addition, the first end plate 181 may have a perforation hole 183 located to correspond to a location of the fuse connection unit 113 formed in the circuit board 110 to allow the first lead 152 of the fuse unit 150 to pass therethrough. The end plate 182 may be adhered to a bottom surface of the battery pack 100 as an insulation sheet.

Figure 8:
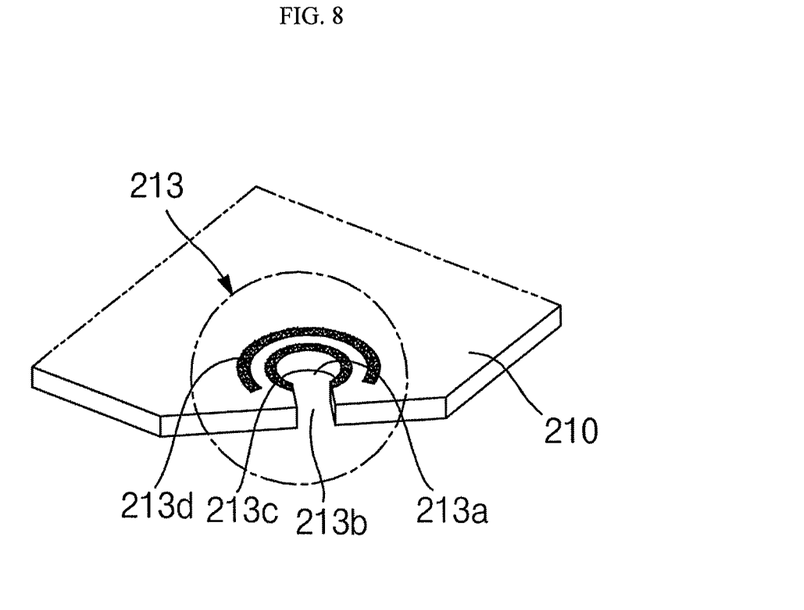
FIG. 8 illustrates a perspective view depicting a fuse connection unit of a circuit board according to another embodiment, corresponding to FIG. 5.

A circuit board 210 of a battery pack according to another embodiment will now be described. FIG. 8 illustrates a perspective view depicting a fuse connection unit 213 of a circuit board 210 according to another embodiment.

The circuit board 210 of the battery pack according to the embodiment may be substantially the same as the circuit board 110 shown in FIG. 5 in view of configuration and functions, except for a configuration of a second soldering pad 213d. Thus, explanations of common features will not be repeated, and the following description will focus on the second soldering pad 213d.

The second soldering pad 213d may be shaped to correspond to the outer circumference of a first soldering pad 213c such that an insufficient solder may be detected in a soldering test. When the first lead 152 is fixed to the circuit board 210 by, for example, soldering, a solder may be coated to receive the second soldering pad 213d. In addition, the solder may be coated on the outer circumference of the fuse connection unit 213, excluding an opening 213b of the fuse connection unit 213. The first soldering pad 213c and the second soldering pad 213d may allow wires formed in the fuse unit 150 and the circuit board 210 to be electrically connected to each other by soldering. In addition, the first lead 152 of the fuse unit 150 may be inserted into or removed from the opening 213b of the fuse connection unit 213. Therefore, the opening 213b may facilitate replacement of the fuse unit 150.

Figure 9:
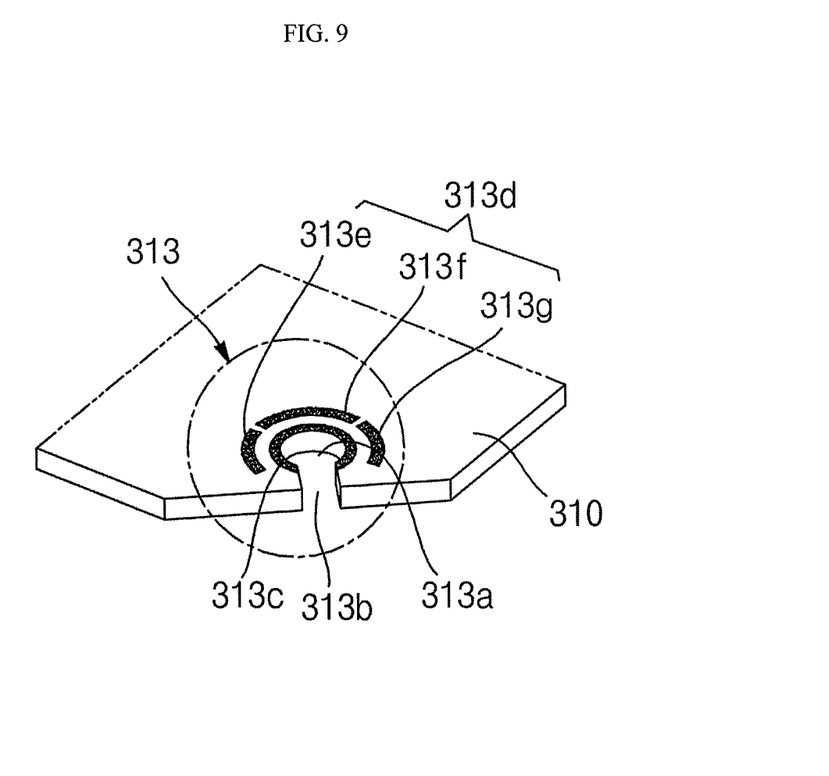
FIG. 9 illustrates a perspective view depicting a fuse connection unit of a circuit board according to still another embodiment, corresponding to FIG. 5.

A circuit board 310 of a battery pack according to another embodiment will now be described. FIG. 9 illustrates a perspective view depicting a fuse connection unit 313 of a circuit board 310 according to another embodiment. The circuit board 310 of the battery pack according to the embodiment may be substantially the same as the circuit board 210 shown in FIG. 8 in view of configuration and functions, except for a configuration of a second soldering pad 313d. Thus, explanations of common features will not be repeated, and the following description will focus on the second soldering pad 313d.

The second soldering pad 313d may be in a shape of an arc that is divided into one or more arc parts 313e, 313f and 313g to allow the solder to be coated well in the soldering process. As shown in FIG. 9, the one or more arc parts 313e, 313f and 313g may be shaped to correspond to an arc shape of the first soldering pad 313c and may be formed to be spaced apart from the first soldering pad 313c at the top surface of the circuit board 310. The solder may be coated on the fuse connection unit 313, excluding the opening 313b of the fuse connection unit 313. The first soldering pad 313c and the second soldering pad 313d may allow wires formed in the fuse unit 150 and the circuit board 310 to be electrically connected to each other by soldering. In addition, the first lead 152 of the fuse unit 150 may be inserted into or removed from the opening 313b of the fuse connection unit 313. Therefore, the opening 313b may facilitate replacement of the fuse unit 150.

Figure 12:
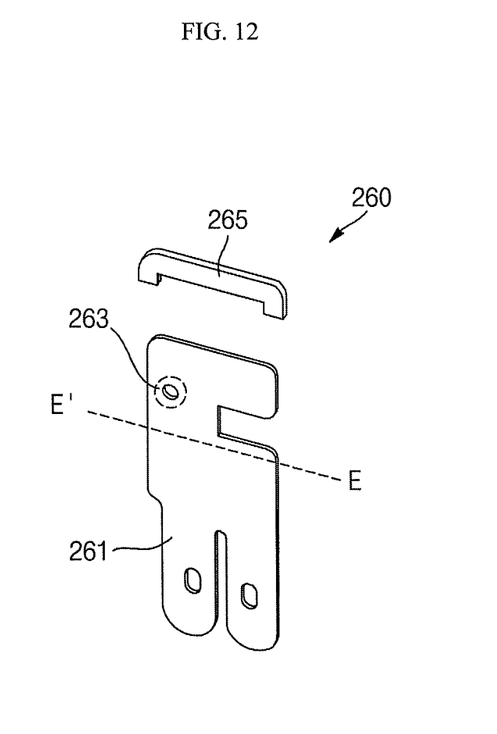
FIG. 12 illustrates an exploded perspective view of a lead member of a battery pack according to another embodiment.

A lead member 260 of a battery pack according to another embodiment will now be described. FIG. 12 illustrates an exploded perspective view of a lead member of a battery pack according to another embodiment.

The lead member 260 of the battery pack according to the embodiment may be substantially the same as the lead member 160 shown in FIG. 11 in view of configuration and functions, except for a configuration of an insulation unit 265. Thus, explanations of common features will not be repeated, and the following description will focus on the insulation unit 265.

The insulation unit 265 may be formed at an end of the lead member 260. The insulation unit 265 may be formed such that a gap is created between a second lead 153 and the lead member 260. Due to a thickness of the insulation unit 265, the second lead 153 may be prevented from contacting the lead member 260, except at the lead connection unit 263 to which the second lead 153 may be fixed by soldering. Accordingly, the second lead 153 may be electrically insulated from the lead member 260. The second lead 153 and the lead member 260 may be electrically connected to each other only at the lead connection unit 263, where the second lead 253 may be fixed by soldering. Therefore, a soldering failure of the second lead 153 in a state in which the second lead 153 is in contact with the lead connection unit 263 may be detected.

By way of summation and review, the embodiments disclosed herein may represent an advance in related art by providing a battery pack, in which a welding defect may be easily detected.

Embodiments disclosed herein may also provide a battery pack including a lead member connected to one side of a battery and an insulation unit connected to one side of the lead member such that a connection defect of a fuse unit may be detected.

Embodiments disclosed herein may also provide a battery pack including circuit board including a fuse connection unit having a hole having one side that is open to an edge of the circuit board such that a fuse unit connected with the fuse connection unit may be easily replaced.

While the embodiments have been described in connection with certain exemplary embodiments, it will be understood by those skilled in the art that the invention is not limited to the disclosed embodiments, but rather is intended to cover various modifications included within the spirit and scope of the appended claims and equivalents thereof.

What is claimed is:

1. A battery pack, comprising:
   a plurality of batteries;
   a housing having a battery receiving unit to receive the plurality of batteries;
   a circuit board electrically connected to the batteries, the circuit board being at an end of the housing; and
   a fuse unit electrically connected between the batteries and the circuit board,
   wherein the fuse unit is coupled to a fuse fixing unit that extends from a side surface of the housing, and the batteries and the fuse unit are connected to a lead member, the lead member including:
   a lead connection unit connected to the fuse unit, the lead connection unit being spaced apart from an end portion of the lead member, and an insulation unit formed between the lead connection unit and the end portion of the lead member.

2. The battery pack as claimed in claim 1, wherein:
the circuit board includes a fuse connection unit to which one portion of the fuse unit is coupled,
the fuse connection unit includes a perforation hole through which the one portion of the fuse unit passes and an opening that connects a portion of the inner surface of the perforation hole to an outer side edge of the circuit board, and
a first soldering pad at least partially surrounds the perforation hole at an exterior-facing surface of the circuit board.

3. The battery pack as claimed in claim 2, wherein the circuit board further includes a second soldering pad, the second soldering pad being spaced apart from and at least partially surrounding the first soldering pad at the exterior-facing surface of the circuit board.

4. The battery pack as claimed in claim 3, wherein the second soldering pad has an arc shape.

5. The battery pack as claimed in claim 4, wherein the second soldering pad is divided into at least two arc-shaped segments.

6. The battery pack as claimed in claim 2, wherein the fuse connection unit is soldered to couple the first soldering pad and the one side of the fuse unit.

7. The battery pack as claimed in claim 3, wherein the fuse connection unit is soldered to receive the second soldering pad and the one portion of the fuse unit.

8. The battery pack as claimed in claim 1, wherein the fuse unit includes:
a fuse body including a fuse element and a sheath member surrounding the exterior of the fuse element;
a first lead connected to one side of the fuse element and protruding to the outside of the fuse body; and
a second lead connected to another side of the fuse element and protruding to the outside of the fuse body.

9. The battery pack as claimed in claim 8, wherein the fuse body is coupled to the fuse fixing unit by an interference fit.

10. The battery pack as claimed in claim 8, wherein:
the fuse fixing unit has an inner surface corresponding in shape to the fuse body, the inner surface extending from the side surface of the housing in an arc shape, and
the fuse body engages the fuse fixing unit such that the fuse body contacts a side surface of the housing.

11. The battery pack as claimed in claim 8, wherein:
the first lead is electrically connected to one battery of the plurality of batteries, and
the second lead is electrically connected to the circuit board.

12. The battery pack as claimed in claim 1, wherein the insulation unit is formed at the end portion of the lead member, and the lead of the fuse unit is placed on the insulation unit.

13. The battery pack as claimed in claim 1, wherein the insulation unit has an insulation tape adhered thereon.

14. The battery pack as claimed in claim 1, wherein the batteries are connected to sub lead members in series or in parallel.

15. The battery pack as claimed in claim 14, wherein:
the sub lead members have extensions that pass through respective lead holes formed in the circuit board, and
the extensions of the sub lead members having passed through the lead holes are coupled to the circuit board by soldering.

16. A battery pack, comprising:
a plurality of batteries;
a housing having a battery receiving unit to receive the plurality of batteries;
a circuit board electrically connected to the batteries, the circuit board being at one end of the housing; and
a fuse unit electrically connected between the batteries and the circuit board,
wherein:
the fuse unit is coupled to a fuse fixing unit that extends from a side surface of the housing,
the circuit board includes a fuse connection unit including a perforation hole through which one portion of the fuse unit passes and an opening that connects a portion of the inner surface of the perforation hole to an outer side edge of the circuit board, and
the batteries and the fuse unit are connected to a lead member, the lead member including:
a lead connection unit connected to the fuse unit, the lead connection unit being spaced apart from an end portion of the lead member, and
an insulation unit formed between the lead connection unit and the end portion of the lead member.

17. The battery pack as claimed in claim 16, wherein the insulation unit has an insulation tape adhered thereon.

18. The battery pack as claimed in claim 16, wherein an exterior surface of the circuit board includes a first soldering pad that at least partially surrounds the perforation hole.

* * * * *